No. 870,517. PATENTED NOV. 5, 1907.
J. A. MASON.
AUTOMOBILE RACK.
APPLICATION FILED APR. 1, 1907.

WITNESSES
A. T. Palmer
L. E. Allen

INVENTOR
John A. Mason
by A. K. Bennett
Attorney

UNITED STATES PATENT OFFICE.

JOHN A. MASON, OF NEWTON, MASSACHUSETTS.

AUTOMOBILE-RACK.

No. 870,517.  Specification of Letters Patent.  Patented Nov. 5, 1907.

Application filed April 1, 1907. Serial No. 365,725.

*To all whom it may concern:*

Be it known that I, JOHN A. MASON, of Newton, in the county of Middlesex and State of Massachusetts, have invented certain new and useful Improvements in Automobile-Racks, of which the following is a specification.

This invention provides automobiles of any suitable type with a folding rack secured to the rear end of the vehicle and adapted to support any desired articles of baggage, or supplies and to be folded out of the way when not required for use.

As here illustrated, the device consists of rigid, horizontal arms, and a folding member pivoted thereto, and projecting rearwardly when in use and upwardly when folded, its flattened marginal rail being furnished with metal loops for passage of the baggage straps and stops being provided near the pivot to limit the downward movement of the folding member when it reaches a horizontal position. Said arms and marginal rail will be of strap iron or steel set edgewise, united by a continuous rod as a pivot, other rods, parallel thereto, preferably completing the folding member. The device has support at its pivotal points by means of two upright suspension rods therefrom having at top a thread and nut connection with the vehicle body or seat.

Figure 1:
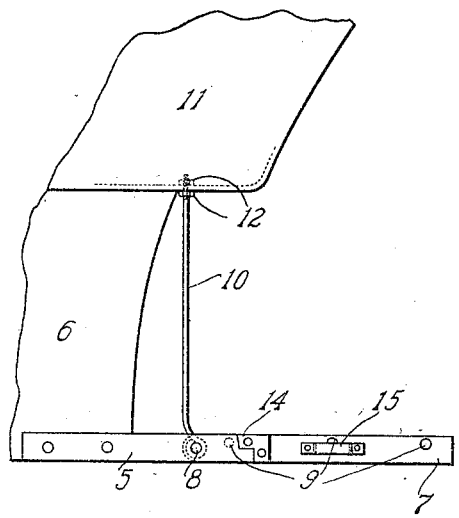
Figure 2:
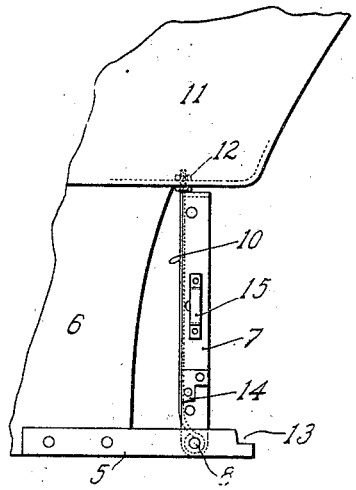
Figure 3:
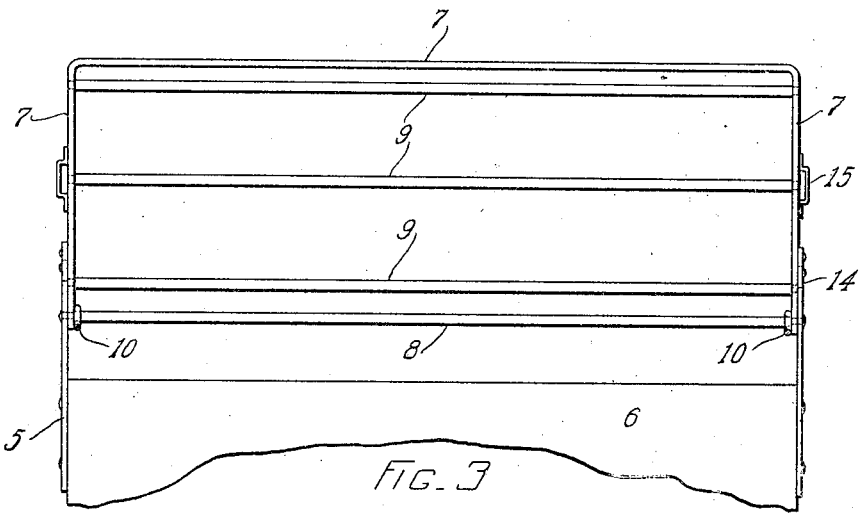

In the drawings,—Figures 1 and 2 are side views of part of an automobile with my improvement applied thereto, and shown respectively in the spread and the folded position. Fig. 3 is a plan of the device, spread for use, and Fig. 4 an upright perspective view on a smaller scale, showing the rack folded.

The supporting arms 5 are rigidly secured to the vehicle body 6, by bolts or otherwise, the edgewise position shown utilizing the strength of the material to the best advantage. 7 represents the margin of the folding rack, bent to form three sides of its rectangular body and pivoted terminally to said arms by a continuous rod 8 forming the fourth side of such body. Other rods 9, shouldered and riveted terminally into the end portions of the strap-steel margin 7, are shown in Figs. 3 and 4.

Figure 4:
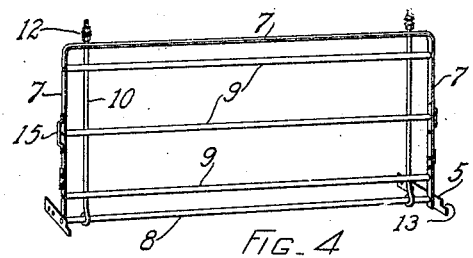

From the pivot 8 suspension rods 10 extend to the seat-base 11, with which they have a threaded connection, to give a substantial support from above, their upper ends being shown as passing through the seat bottom and furnished with adjustable nuts 12 above and below it, as indicated in Figs. 1, 2 and 4. These suspension rods form vertical supports against which the baggage may bear. They are preferably bent into a ring at foot to encircle the pivot rod 8, while their upright portions are in close proximity with the parts of the folded rack (see Figs. 1, 2 and 4). In Fig. 3, the ring portion of each rod 10 is shown at the pivoted ends of the rack margin 7.

A suitable form of stop device is illustrated in Figs. 1, 2 and 4 for supporting the rack in its spread position. The outer ends of the arms 5 terminate in an offset or recess 13, to engage a corresponding projection 14 formed on or fixed to the marginal arm 7 of the rack near to the pivot 8. These members of the stop engage and disengage in the two positions shown in Figs. 1 and 2. The construction may be modified, within the scope of the appended claims, without departing from the spirit of my invention. Loops 15, (Figs. 3 and 4) are provided to receive the baggage strap.

I disclaim a detachable luggage carrier for bicycles, such as is shown in U. S. Patent No. 767,823, that device being suspended from the handle-bar and having no supports rigidly secured to the vehicle; but the rack and luggage thereon made to swing with every movement of the handle-bar and stem. This would be wholly unsuitable for automobile uses.

I claim as my invention:

1. A folding rack for automobiles and the like, comprising a skeleton frame of rigid material pivoted at its lower corners to projecting supports rigidly secured to the vehicle, the device having also depending supports connecting it to the seat-base, for the purpose set forth.

2. The improved automobile rack described, comprising rigid horizontal arms and a folding member, pivoted thereto, formed marginally of strap steel set edgewise, its end portions being bent into parallelism and connected by parallel rods, one of said rods forming the fourth or lower side of said member and the pivot which unites it to said arms, each arm projecting beyond the pivot and formed with a stop to support the folding member when spread, substantially as set forth.

In testimony whereof I have affixed my signature, in presence of two witnesses.

JOHN A. MASON.

Witnesses:
 A. H. SPENCER,
 G. F. BUTTERFIELD.